United States Patent
Porcherie et al.

(10) Patent No.: US 9,394,202 B2
(45) Date of Patent: Jul. 19, 2016

(54) COMPOSITIONS AND METHODS FOR WELL CEMENTING

(75) Inventors: Olivier Porcherie, Paris (FR); Elena Pershikova, Paris (FR); Nigel Evans, Paris (FR); Hafida Achtal, Clamart (FR); Yamina Boubeguira, Clamart (FR); Benedicte Ayache-Zusatz, Châtenay Malabry (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 576 days.

(21) Appl. No.: 13/096,039

(22) Filed: Apr. 28, 2011

(65) Prior Publication Data

US 2011/0284223 A1 Nov. 24, 2011

(30) Foreign Application Priority Data

May 3, 2010 (EP) .................................... 10290234

(51) Int. Cl.
| | | |
|---|---|---|
| C04B 28/00 | (2006.01) |
| C09K 8/467 | (2006.01) |
| C04B 103/20 | (2006.01) |
| C04B 103/44 | (2006.01) |
| C04B 111/76 | (2006.01) |

(52) U.S. Cl.
CPC .............. *C04B 28/006* (2013.01); *C09K 8/467* (2013.01); *C04B 2103/20* (2013.01); *C04B 2103/44* (2013.01); *C04B 2111/763* (2013.01); *Y02P 40/165* (2015.11)

(58) Field of Classification Search
None
See application file for complete search history.

(56) References Cited

U.S. PATENT DOCUMENTS

| | | | |
|---|---|---|---|
| 4,509,985 A | | 4/1985 | Davidovits et al. |
| 4,859,367 A | | 8/1989 | Davidovits |
| 5,049,288 A | * | 9/1991 | Brothers et al. ................. 524/5 |
| 5,349,118 A | | 9/1994 | Davidovits |
| 5,356,579 A | | 10/1994 | Jennings et al. |
| 5,501,277 A | * | 3/1996 | Onan et al. .................... 166/293 |
| 5,539,140 A | | 7/1996 | Davidovits |
| 5,626,665 A | | 5/1997 | Barger et al. |

(Continued)

FOREIGN PATENT DOCUMENTS

| | | |
|---|---|---|
| EP | 1887064 | 2/2008 |
| EP | 2093200 | 2/2008 |

(Continued)

OTHER PUBLICATIONS

Skvara et al., Alkali-Activated Fly Ash Geopolymeric Materials; May 2003; International Congress on the Chemistry of Cement; pp. 1-10.*

(Continued)

*Primary Examiner* — Angela M DiTrani
*Assistant Examiner* — Anuradha Ahuja
(74) *Attorney, Agent, or Firm* — Jeremy D. Tillman; Mike Flynn; Tim Curington

(57) ABSTRACT

Organic compounds containing at least one nitrogen atom are particularly suitable as retarders for geopolymeric systems employed as well cements. Preferred compounds include aminated polymers, amine phosphonates, quaternary ammonium compounds and tertiary amines. The geopolymeric compositions are suitable for primary cementing and remedial cementing operations. The preferred temperature range within which the retarders operate is between about 20° C. and 120° C.

6 Claims, 2 Drawing Sheets

(56) References Cited

U.S. PATENT DOCUMENTS

| | | |
|---|---|---|
| 5,635,292 A | 6/1997 | Jennings et al. |
| 5,637,412 A | 6/1997 | Jennings et al. |
| 5,788,762 A | 8/1998 | Barger et al. |
| 2005/0022992 A1* | 2/2005 | Di Lullo Arias et al. ...... 166/285 |
| 2006/0289162 A1* | 12/2006 | Santra et al. ................... 166/292 |
| 2008/0028994 A1* | 2/2008 | Barlet-Gouedard et al. . 106/811 |
| 2008/0028995 A1 | 2/2008 | Barlet-Gouedard et al. |
| 2008/0156491 A1 | 7/2008 | Roddy et al. |
| 2009/0139719 A1 | 6/2009 | Luo et al. |
| 2012/0175134 A1* | 7/2012 | Robisson et al. ............. 166/387 |

FOREIGN PATENT DOCUMENTS

| | | |
|---|---|---|
| EP | 1887065 | 11/2010 |
| WO | 2005019130 | 3/2005 |
| WO | 2008017413 | 2/2008 |
| WO | 2008017414 | 2/2008 |
| WO | 2009024829 | 2/2009 |

OTHER PUBLICATIONS

Davidovits, J: "Synthesis of New High-Temperature Geo-Polymers for Reinforced Plastics/Composites," Society of Plastics Engineers, IUPAC International Symposium on Macromolecules, Stockholm (1976).

Search Report for the equivalent EP patent application No. 10290234.3 issued on Sep. 24, 2010.

Examination report for the equivalent Australian patent application No. 2011201933 issued on Jan. 21, 2015.

* cited by examiner

COMPOSITIONS AND METHODS FOR WELL CEMENTING

CROSS-REFERENCED APPLICATIONS

This application claims the benefit of the disclosure of European Patent Application No EP10290234.3 filed on May 3, 2010 incorporated by reference in its entirety.

BACKGROUND

The statements in this section merely provide background information related to the present disclosure and may not constitute prior art.

This disclosure relates to compositions and methods for treating subterranean formations, in particular, compositions and methods for cementing subterranean wells.

Geopolymers are a novel class of materials that are formed by chemical dissolution and subsequent recondensation of various aluminosilicate oxides and silicates to form an amorphous three-dimensional framework structure. The term geopolymer was proposed and first used by J. Davidovits. His work is described in the following publication: Davidovits, J: "Synthesis of New High-Temperature GeoPolymers for Reinforced Plastics/Composites," Society of Plastics Engineers, IUPAC International Symposium on Macromolecules, Stockholm (1976). Other terms have been used to describe materials synthesized utilizing a similar chemistry, such as alkali-activated cement, geocement, alkali-bonded ceramic, inorganic polymer, hydroceramic. In the following description, the term geopolymer will be used.

Geopolymers based on aluminosilicates are generally designated as poly(sialate), which is an abbreviation for poly (silicon-oxo-aluminate) or $(-Si-O-Al-O-)_n$ (with n being the degree of polymerization). The sialate network consists of $SiO_4$ and $AlO_4$ tetrahedra linked alternately by sharing all the oxygens, with $Al^{3+}$ and $Si^{4+}$ in IV-fold coordination with oxygen. Positive ions ($Na^+$, $K^+$, $Li^+$, $Ca^{2+}$, ...) must be present in the framework cavities to balance the charge of $Al^{3+}$ in IV-fold coordination.

The three-dimensional network (3D) geopolymers are summarized in the table below.

TABLE 1

Geopolymers chemical designation (wherein M is a cation such as potassium, sodium or calcium, and n is a degree of polymerization)

| Si/Al ratio | Designation | Structure | Abbreviations |
|---|---|---|---|
| 1 | Poly(sialate) | $M_n(-Si-O-Al-O-)_n$ | (M)-PS |
| 2 | Poly(sialate-siloxo) | $M_n(-Si-O-Al-O-Si-O)_n$ | (M)-PSS |
| 3 | Poly(sialate-disiloxo) | $M_n(-Si-O-Al-O-Si-O-Si-O-)_n$ | (M)-PSDS |

The properties and application fields of geopolymers will depend principally on their chemical structure, and more particularly on the atomic ratio of silicon versus aluminum. Geopolymers have been investigated for use in a number of applications, including as cementing systems within the construction industry, as refractory materials, as coatings, as ceramic precursors and as encapsulants for hazardous and radioactive waste streams. Geopolymers are also referenced as rapid setting and hardening materials. Compared to conventional Portland cement, they typically exhibit superior hardness and chemical stability.

Geopolymer synthesis involves the suspension of solid raw materials, such as the above mentioned aluminosilicates, into a carrier fluid. The fluid-to-solid ratio of this suspension affects properties of the suspension, such as for example, its viscosity and hardening time, and the properties of the hardened material obtained from the same suspension. Adjustment of the viscosity of this geopolymeric suspension without altering the other properties is critical in many applications such as the homogeneous coating thickness, the molding of ceramic pieces or the placement of the cement in a building structure or in well cementing.

Some applications require a control of the thickening time and setting time of the geopolymeric suspension. Well cementing, in particular, implies controlling the consistency of the suspension at various temperatures encountered by the fluid in order to achieve proper fluid placement It entails that thickening and setting times need to be controlled, depending on, for example, temperatures encountered by the fluid during its placement and the geometry of the well.

Several documents disclose the use of geopolymer compositions in the construction industry, each of which is incorporated herein by reference thereto. In particular U.S. Pat. No. 4,509,985 discloses a mineral polymer composition employed for the making of cast or molded products at room temperature, or temperatures generally up to 120° C.; U.S. Pat. No. 4,859,367, U.S. Pat. No. 5,349,118 and U.S. Pat. No. 5,539,140 disclose a geopolymer for solidifying hazardous waste materials and storing them for very long time periods, comparable to certain archeological materials; U.S. Pat. No. 5,356,579, U.S. Pat. No. 5,788,762, U.S. Pat. No. 5,626,665, U.S. Pat. No. 5,635,292 U.S. Pat. No. 5,637,412 and U.S. Pat. No. 5,788,762 disclose cementitious systems with enhanced compressive strengths or low density for construction applications. WO 2005019130 highlights the problem of controlling the setting time of geopolymer systems in the construction industry.

More recently WO 2008017414 A1 and WO 2008017413 A1, describe the application of geopolymers in the oilfield industry, well cementing in particular. These documents state that well cementing involves controlling the mixability, pumpability and stability of the suspension at various temperatures encountered by the fluid in order to achieve proper fluid placement, and controlling the rate at which the suspension sets and hardens. In addition, the solid-to-fluid ratio is adjusted to optimize the density of the suspension, and the mechanical properties and permeability of the hardened material. It is well known that increasing the temperature of a geopolymer suspension will accelerate the setting time. Thus, these documents mention different methods for controlling the thickening time, such as the nature and/or the pH and/or the concentration of the activator, and/or the concentration of the alkali-metal silicate. The accelerative effect may also be mitigated to some extent by choosing an aluminosilicate with lower reactivity (e.g. fly ash). However, these approaches may still be inadequate at the temperatures encountered during well-cementing operations.

Unlike Portland cement, for which hundreds of additives have been developed to modify its performance over a wide range of conditions, the population of additives useful in the context of geopolymers is comparatively sparse. Therefore, despite the valuable contributions of the prior art, there is a continuing need for additives, particularly retarders, that are useful to control the thickening time, setting time or both of geopolymeric systems in the context of well cementing.

SUMMARY

Disclosed are improvements by providing retarders that control the thickening and setting behavior of geopolymeric systems in a subterranean-well environment.

In an aspect, embodiments relate to compositions for controlling the thickening time, setting time or both of a geopolymeric system. The compositions comprise at least one organic compound comprising at least one nitrogen atom.

Further aspects are methods for controlling the thickening time, setting time or both of a geopolymeric system, comprising the step of providing a composition comprising at least one organic compound comprising at least one nitrogen atom and mixing it with a geopolymeric composition comprising an aluminosilicate source, an alkali activator and a carrier fluid.

Yet further aspects are methods for cementing a subterranean well having a borehole. The methods comprise the steps of providing a geopolymeric composition to which a composition comprising at least one organic compound comprising at least one nitrogen atom has been added, pumping the geopolymeric composition into the borehole and allowing the composition to set and harden.

BRIEF DESCRIPTION OF THE DRAWINGS

For a more complete understanding, and the advantages thereof, reference is now made to the following descriptions taken in conjunction with the accompanying figures, in which.

DETAILED DESCRIPTION

Figure 1:
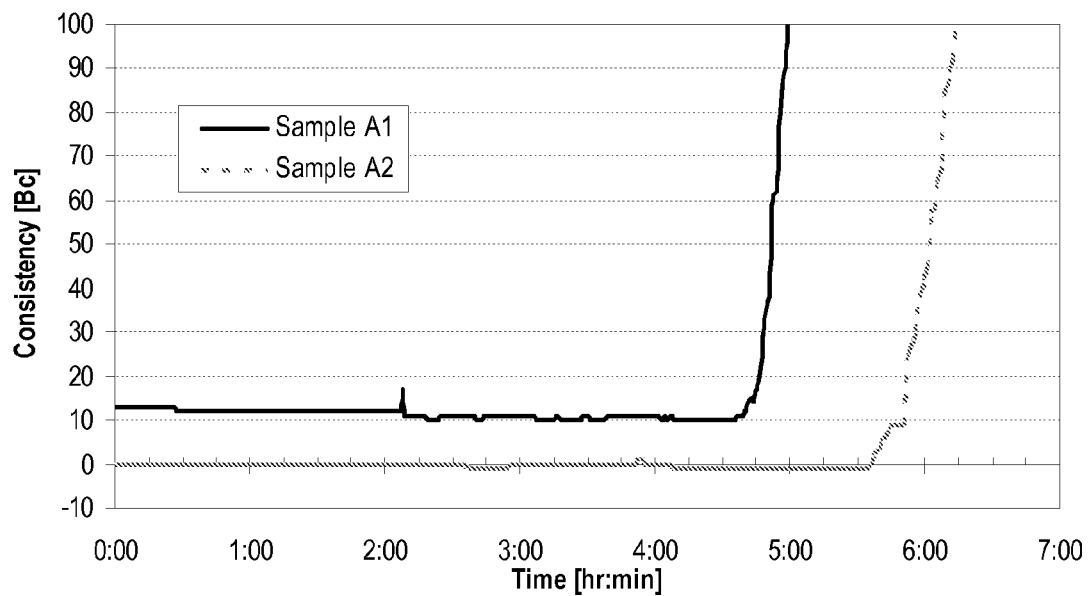
FIG. 1 is an API (American Petroleum Institute) thickening-time chart depicting the performance of a lignin amine as a retarder in a geopolymeric composition.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

As stated earlier, geopolymeric formulations generally comprise an aluminosilicate source, an activator and a carrier fluid. The carrier fluid is preferably water, more preferably fresh water.

Aluminosilicate sources from which geopolymers may be formed include ASTM Class C fly ash, ASTM Class F fly ash, ground blast furnace slag, calcined clays, partially calcined clays (e.g., metakaolin), silica fume containing aluminum, natural aluminosilicate, feldspars, dehydrated feldspars, alumina and silica sols, synthetic aluminosilicate glass powder, zeolite, scoria, allophone, bentonite and pumice. These materials become reactive when placed in strongly alkaline solutions, typically at a pH greater than 11. Preferred aluminosilicates include fly ash, metakaolin and blast furnace slag. Mixtures of two or more aluminosilicate sources may also be used if desired. Optionally, one may add one or more secondary binder components chosen from the list comprising Portland cement, kaolin, bauxite, aluminum oxide and aluminum hydroxide.

The activator may generally be an alkaline material. Carbonate salts (such as sodium carbonate) may be used or, more preferably, a metal silicate, a metal aluminate or a soluble metal hydroxide. Preferred materials include sodium hydroxide, potassium hydroxide, and alkaline-earth-metal hydroxides such as calcium hydroxide, or combinations thereof. The metal hydroxide may be in solid form or an aqueous solution.

A typical property of geopolymeric systems is their ability to set without delay after mixing. However, for well cementing applications, mixable and pumpable geopolymeric suspensions are required. For this reason, the dissolution of the aluminosilicate must be delayed or retarded, the polymerization of the dissolved species must be delayed or retarded, or both.

The inventors have discovered that organic compounds that contain at least one nitrogen atom are effective as retarders for geopolymeric systems. They have the ability to control the thickening time, setting time or both. Without wishing to be bound by any theory, when aluminosilicates are immersed in a highly alkaline environment (e.g., pH>11), silanol and aluminol groups at the aluminosilicate-particle surfaces are hydrolyzed and negatively charged. Molecules that could interact with the negatively charged surfaces and protect them from the carrier fluid may hinder the aluminosilicate dissolution rate. Such compounds also have to be stable in the high-pH environment. Ammonium compounds and amines have proven that they fulfill this requirement. Another requirement is that the organic compound be soluble in the high-pH environment and not precipitate.

Preferred retarders in the present context include aminated polymers, amine phosphonates, quaternary ammonium compounds and tertiary amines. The preferred retarder-concentration range may be from about 0.01% to 10% by weight of aluminosilicate (BWOA). A more preferred concentration range may be between about 0.01% and 5% BWOA. The preferred temperature range within which the retarders operate may be between about 20° C. and 120° C. And, as described above, the retarders are preferably soluble in an aqueous environment at a pH greater than about 11.

Further embodiments relate to methods for controlling the thickening time, setting time or both of a geopolymeric composition. The methods comprise at least two steps. On one side, a retarder made from organic compounds that contain at least one nitrogen atom is provided. On the other side, the retarder is mixed with a geopolymeric composition comprising an aluminosilicate source, an activator and a carrier fluid. The carrier fluid being preferably water. It has to be noted that all the ingredients do not have to be added separately; for example, the activator, retarder, or both may be premixed in the carrier fluid.

Preferred retarders include aminated polymers, amine phosphonates, quaternary ammonium compounds or tertiary amines and mixtures thereof. The preferred retarder-concentration range may be from about 0.01% to 10% by weight of aluminosilicate (BWOA). A more preferred concentration range may be between about 0.01% and 5% BWOA. The preferred temperature range within which the retarders operate may be between about 20° C. and 120° C., preferably between about 20° C. and 85° C. The retarders are preferably soluble in an aqueous environment at a pH greater than about 11.

Methods for cementing a subterranean well having a borehole are also disclosed. The methods comprise providing a geopolymeric composition. The composition comprises an aluminosilicate source, an activator, a carrier fluid and a retarder made from organic compounds that contain at least one nitrogen atom. The method further comprises pumping the geopolymeric composition into the borehole. In the context of primary cementing, the composition may be pumped into the annular region between a casing string and the borehole wall, or the annular region between a casing string and a previously placed casing string. Alternatively, in the context of remedial cementing, the composition may be used to perform plug cementing or squeeze cementing operations. Finally, the methods comprise a step where, the composition is allowed to set and harden, thereby providing casing support, zonal isolation or both.

Those skilled in the art will appreciate that the geopolymeric compositions should be mixable and pumpable according to the customary standards of the well cementing industry. A pumpable composition in the oilfield industry usually has a plastic viscosity less than or equal to 300 cP, preferably less than or equal to 250 cP Those skilled in the art will also appreciate that the compositions and methods disclosed herein may be used in oil wells, gas wells, water wells, geothermal wells, steam-injection wells, toe-to-heel air injection wells and acid gas wells.

In further embodiments, the geopolymeric compositions can be supplemented with various additives if useful in the context in which they are used or to adapt the viscosity of the pumpable composition; examples are mixing aids, setting accelerators, gas generating additives fluid loss additives or dispersing agent and mixtures thereof.

The following examples are further illustrative.

EXAMPLES

The examples involve tests performed in accordance with API/ISO standards published in ISO Document 10426-2, entitled "Recommended Practice for Testing Well Cements."

Example 1

Two geopolymeric cement slurries A1 and A2, were prepared. Slurry A1 had the following composition: 562 g Class C fly ash, 54 g sodium disilicate, 391 g laboratory tap water and 36 g sodium hydroxide. Slurry A2 had the following composition: 562 g Class C fly ash, 54 g sodium disilicate, 393 g laboratory tap water, 36 g sodium hydroxide and 11.2 g of a retarder. The retarder composition was as follows: 50 wt % lignin amine; 50 wt % sodium glucoheptonate. The retarder concentration corresponds to 2% by weight of aluminosilicate (BWOA). Table 2 shows the influence of the retarder on the rheological properties and stability of the geopolymeric slurry at 85° C. bottomhole circulating temperature (BHCT).

TABLE 2

Influence of Lignin Amine Based Retarder on the Rheological Properties and Stability of a Geopolymer Slurry (BHCT = 85° C.)

| Slurry | A1 | A2 |
|---|---|---|
| Retarder concentration (% BWOA) | 0 | 2 |
| Rheological Properties After Mixing | | |
| Plastic Viscosity [cP] | 35 | 22 |
| Yield Value [lbf/100 ft$^2$] | 15 | 2.3 |
| Rheological Properties After Conditioning | | |
| Plastic Viscosity [cP] | 45 | 26 |
| Yield Value [lbf/100 ft$^2$] | 17 | 7 |
| Gel Strength | | |
| 10-second gel [lbf/100 ft$^2$] | 8 | 7 |
| 10-min gel [lbf/100 ft$^2$] | 16 | 9 |
| 1-min stirring [lbf/100 ft$^2$] | 11 | 7 |
| Free Fluid [mL] | 0 | 0 |

Thickening time tests were performed with Slurries A1 and A2. The tests were performed at 85° C. BHCT in a pressurized consistometer according to API Schedule 9.8. The results are shown in FIG. 1. Both slurries exhibited right-angle-set behavior, generally defined as a very rapid slurry-consistency increase from less than 30 Bc to 100 Bc (Bc stands for Bearden consistency). However, the presence of the lignin-amine based retarder extended the thickening time from 4:59 to 6:14.

Example 2

Two geopolymeric cement slurries B1 and B2, were prepared. Slurry B1 had the following composition: 562 g Class C fly ash, 54 g sodium disilicate, 391 g laboratory tap water and 36 g sodium hydroxide. Slurry B2 had the following composition: 562 g Class C fly ash, 54 g sodium disilicate, 393 g laboratory tap water, 36 g sodium hydroxide and 5.6 g of a retarder. The retarder was a quaternary ammonium compound—VX7739 available from Nalco Energy Services, Inc. The retarder concentration corresponds to 1% by weight of aluminosilicate (BWOA). Table 3 shows the influence of the retarder on the rheological properties and stability of the geopolymeric slurry at 85° C. bottomhole circulating temperature (BHCT).

TABLE 3

Influence of Quaternary Ammonium Based Retarder on the Rheological Properties and Stability of a Geopolymer Slurry (BHCT = 85° C.)

| Slurry | B1 | B2 |
|---|---|---|
| Retarder concentration (% BWOA) | 0 | 1 |
| Rheological Properties After Mixing | | |
| Plastic Viscosity [cP] | 35 | 34 |
| Yield Value [lbf/100 ft$^2$] | 15 | 17 |
| Rheological Properties After Conditioning | | |
| Plastic Viscosity [cP] | 45 | 36 |
| Yield Value [lbf/100 ft$^2$] | 17 | 11 |
| Gel Strength | | |
| 10-second gel [lbf/100 ft$^2$] | 8 | 8 |
| 10-min gel [lbf/100 ft$^2$] | 16 | 12 |
| 1-min stirring [lbf/100 ft$^2$] | 11 | 10 |
| Free Fluid [mL] | 0 | 0 |

Figure 2:
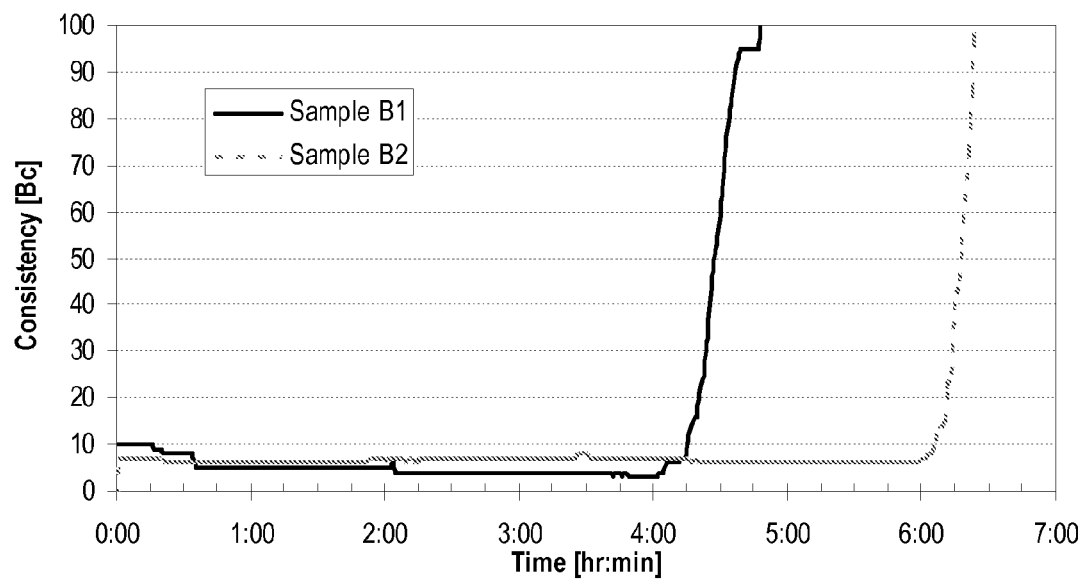
FIG. 2 is an API thickening-time chart depicting the performance of a quaternary ammonium compound as a retarder in a geopolymeric composition.

Thickening time tests were performed with Slurries B1 and B2. The tests were performed at 85° C. BHCT in a pressurized consistometer according to API Schedule 9.8. The results are shown in FIG. 2. Both slurries exhibited right-angle-set behavior. However, the presence of the quaternary ammonium based retarder extended the thickening time from 4:48 to 6:25.

Example 3

Two geopolymeric cement slurries C1 and C2, were prepared. Slurry C1 had the following composition: 314 g metakaolin, 227 g sodium disilicate, 358 g laboratory tap water and 17.2 g sodium hydroxide. Slurry C2 had the following composition: 314 g metakaolin, 227 g sodium disilicate, 327 g laboratory tap water, 17.2 g sodium hydroxide and 35.6 g of a retarder The retarder was an aqueous solution containing 6.54 wt % pentasodium ethylenediamine tetramethyl phosphonate (EDTMP) and 7.56 wt % phosphoric acid. The retarder concentration corresponded to 1% by weight of aluminosilicate (BWOA).

Figure 3:
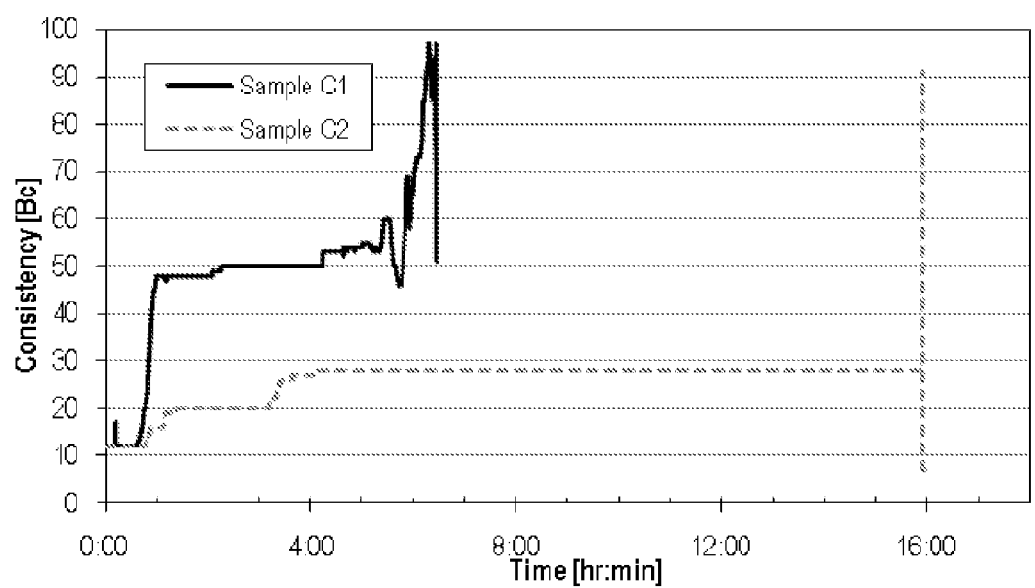
FIG. 3 is an API thickening-time chart depicting the performance of an amine phosphonate as a retarder in a geopolymeric composition.

Thickening time tests were performed with Slurries C1 and C2. The tests were performed at 57° C. BHCT in a pressurized consistometer according to API Schedule 9.6. The results are shown in FIG. 3. The presence of the amine phosphonate based retarder extended the thickening time from 6:26 to more than 16 hours.

Although various embodiments have been described with respect to enabling disclosures, it is to be understood the disclosure is not limited to the disclosed embodiments. Variations and modifications that would occur to one of skill in the art upon reading the specification are also within the scope of this disclosure, which is defined in the appended claims.

The invention claimed is:

1. A method for cementing a subterranean well having a borehole, comprising:
   (i) providing a cementing composition comprising:
      a. a geopolymer composition consisting of an aluminosilicate source, an activator and a carrier fluid; and
      b. a retarder that comprises at least one organic compound comprising at least one nitrogen atom such that the retarder retards a setting time, a thickening time, or both of the geopolymer composition;
   (ii) pumping the composition into the borehole; and
   (iii) allowing the composition to set and harden,
   wherein the activator is a carbonate salt, a metal silicate, a metal aluminate, sodium hydroxide or potassium hydroxide,
   wherein the geopolymer composition undergoes dissolution followed by polycondensation to form a poly(sialate) network, a poly(sialate-siloxo) network or a poly(sialate-disiloxo) network.

2. The method of claim 1, wherein the organic compound comprises one or more members of the group comprising aminated polymers, amine phosphonates, quaternary ammonium compounds and tertiary amines.

3. The method of claim 2, wherein the organic compound is soluble in an aqueous environment at a pH greater than about 11.

4. The method of claim 3, wherein the retarder is present at a concentration between about 0.01 percent and 10 percent by weight of the aluminosilicate source (BWOA).

5. The method of claim 4, wherein the cementing composition further comprises one or more of members of the list consisting of portland cement, kaolin, bauxite, aluminum oxide and aluminum hydroxide.

6. The method of claim 5, wherein the well is an oil well, a gas well, a water well, a geothermal well, a steam-injection well, a toe-to-heel air injection well or an acid gas well.

* * * * *